United States Patent
Shoemake

(10) Patent No.: US 7,257,094 B2
(45) Date of Patent: Aug. 14, 2007

(54) JOINTLY CONTROLLING TRANSMISSION RATE AND POWER IN A COMMUNICATIONS SYSTEM

(75) Inventor: Matthew B. Shoemake, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 995 days.

(21) Appl. No.: 10/051,254

(22) Filed: Jan. 16, 2002

(65) Prior Publication Data

US 2002/0105925 A1   Aug. 8, 2002

Related U.S. Application Data

(60) Provisional application No. 60/262,007, filed on Jan. 16, 2001.

(51) Int. Cl.
  *G08C 17/00* (2006.01)
(52) U.S. Cl. .................. 370/311; 370/312; 370/313; 370/465; 455/522; 455/523
(58) Field of Classification Search ............... 370/204, 370/206, 208, 278, 328, 333, 436, 311, 312, 370/313; 455/522, 523
  See application file for complete search history.

(56) References Cited

U.S. PATENT DOCUMENTS

| | | | | |
|---|---|---|---|---|
| 5,825,761 | A * | 10/1998 | Tanaka et al. | 370/333 |
| 5,862,453 | A * | 1/1999 | Love et al. | 455/69 |
| 6,393,276 | B1 * | 5/2002 | Vanghi | 455/422.1 |
| 6,711,416 | B1 * | 3/2004 | Zhang | 455/522 |
| 6,735,420 | B2 * | 5/2004 | Baldwin | 455/127.2 |
| 6,738,646 | B2 * | 5/2004 | Miyoshi et al. | 455/561 |
| 6,754,169 | B2 * | 6/2004 | Baum et al. | 370/204 |
| 6,760,587 | B2 * | 7/2004 | Holtzman et al. | 455/436 |
| 6,760,882 | B1 * | 7/2004 | Gesbert et al. | 714/774 |
| 6,782,271 | B2 * | 8/2004 | Huh et al. | 455/522 |
| 6,785,227 | B1 * | 8/2004 | Lu et al. | 370/229 |
| 6,802,035 | B2 * | 10/2004 | Catreux et al. | 714/746 |
| 6,820,231 | B2 * | 11/2004 | Lee et al. | 714/781 |
| 6,850,499 | B2 * | 2/2005 | Wheatley et al. | 370/328 |
| 6,859,446 | B1 * | 2/2005 | Gopalakrishnan et al. | 370/335 |
| 6,920,172 | B2 * | 7/2005 | Williams et al. | 375/136 |
| 6,941,152 | B2 * | 9/2005 | Proctor et al. | 455/522 |
| 6,944,402 | B1 * | 9/2005 | Baker et al. | 398/128 |
| 6,947,490 | B1 * | 9/2005 | Edwards et al. | 375/261 |
| 6,970,681 | B2 * | 11/2005 | Darabi et al. | 455/73 |
| 6,973,098 | B1 * | 12/2005 | Lundby et al. | 370/491 |
| 7,010,317 | B2 * | 3/2006 | Hwang et al. | 455/522 |
| 2001/0051530 | A1 * | 12/2001 | Shiotsu et al. | 455/522 |
| 2002/0036994 | A1 * | 3/2002 | Huh et al. | 370/329 |
| 2002/0085502 | A1 * | 7/2002 | Chheda et al. | 370/252 |
| 2003/0078010 | A1 * | 4/2003 | Davis | 455/69 |
| 2003/0086405 | A1 * | 5/2003 | Silva et al. | 370/342 |

\* cited by examiner

*Primary Examiner*—Wing Chan
*Assistant Examiner*—Andrew C. Lee
(74) *Attorney, Agent, or Firm*—Steven A. Shaw; W. James Brady; Frederick J. Telecky, Jr.

(57) ABSTRACT

The present invention jointly controls rate and power in a fashion that enables control of the two variables in one dimension. In some embodiments, this is done by ordering the possible transmit rate (320) and transmit power (340) combinations in a logical sequence that meets specific conditions. The present invention can first minimize the transmit time and then reduce the transmit power. The present invention can maintain the maximum rate possible that enables the receiving station to decode packets with an acceptable probability.

17 Claims, 4 Drawing Sheets

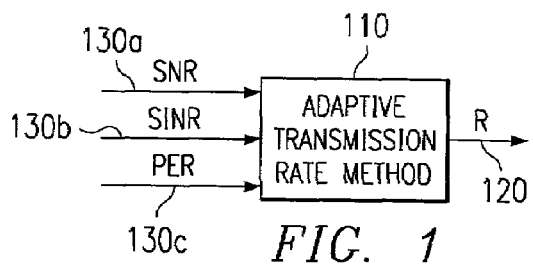
FIG. 1
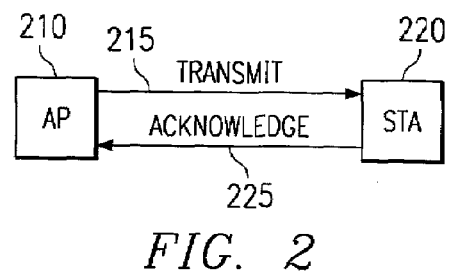
FIG. 2
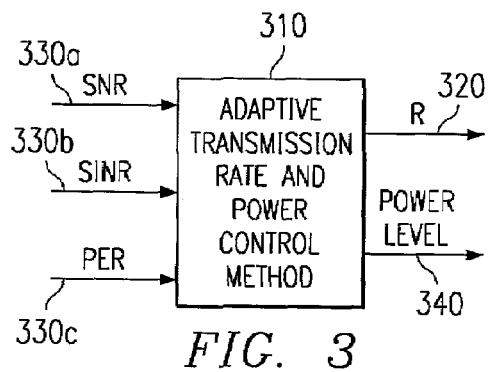
FIG. 3
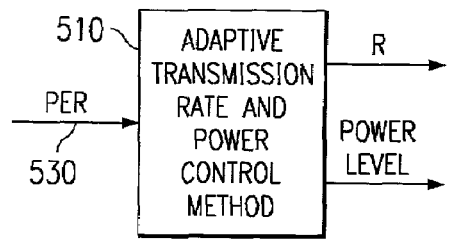
FIG. 5A
| INDEX | RATE (Mbps) | POWER (mW) |
|---|---|---|
| 1 | 1 | 100 |
| 2 | 2 | 100 |
| 3 | 5.5 | 100 |
| 4 | 11 | 100 |
| 5 | 22 | 100 |
| 6 | 22 | 30 |
| 7 | 22 | 10 |
| 8 | 22 | 5 |
| 9 | 22 | 1 |
FIG. 4
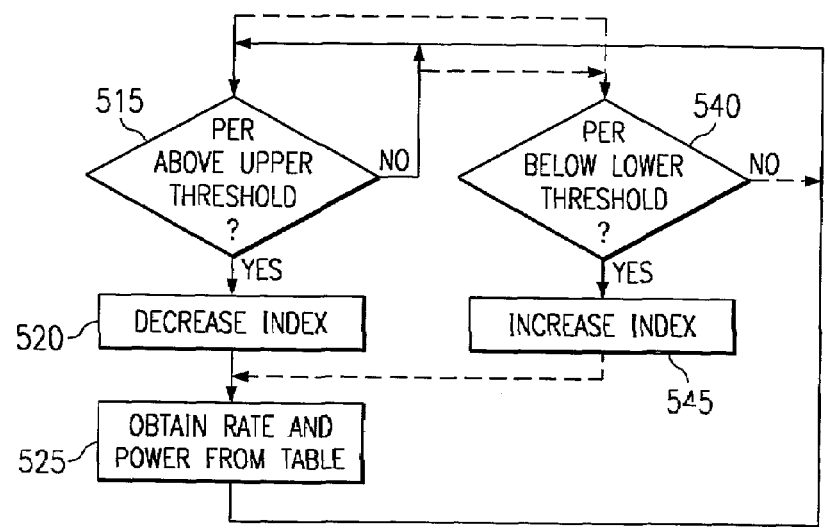
FIG. 5B

JOINTLY CONTROLLING TRANSMISSION RATE AND POWER IN A COMMUNICATIONS SYSTEM

This application claims the priority under 35 U.S.C. § 119(e)(1) of copending U.S. provisional application No. 60/262,007 filed on Jan. 16, 2001, and incorporated herein by reference.

FIELD OF THE INVENTION

The invention relates generally to communications systems and, more particularly, to controlling transmission rate and power in a communications system.

BACKGROUND OF THE INVENTION

Communications systems which employ wireless transceivers are well known. However, as is the case with most electronic technologies today, there is an ever-increasing demand to improve information transmission rates and reduce power consumption while, at the same time, reducing the influence of noise and improving the quality of transmission. A fixed transmission power limits the transmission rate. The longer a transmission takes, the more power is consumed. Therefore, it is desirable to decrease the amount of time a given transmission takes. Additionally, different transmission rates affect the quality of the transmission. For example, higher transmission rates are more susceptible to noise. Increased noise results in decreased transmission rates.

Current communications systems control the transmission rate and the transmission power independently using two (2) control variables. One power control algorithm monitors network conditions. In response, the power control algorithm updates the power control variable at a regular interval. A separate algorithm monitors channel conditions to adjust the data rate. Neither algorithm can guarantee the highest possible transmission rate at the lowest possible transmission power, nor do the algorithms minimize the level of interference generated to other devices.

Wireless devices tend to interfere with one another due to reasons such as lack of mutual protocol, use of an unlicensed frequency band or use of a collision based access mechanism. An example of interference generated by lack of a mutual protocol is the simultaneous co-located use of Bluetooth and IEEE 802.11b devices. Neither device is able to directly communicate with the other, and their differing protocols result in packet collisions, which in turn results in lost data on both the Bluetooth and IEEE 802.11b network. The use of unlicensed bands such as the 2.4 GHz ISM band or the 5 GHz U-NII band also results in devices that must contend for the wireless medium in an interference environment. In addition, some protocols, such as the IEEE 802.11 Distributed Coordination Function (DCF) channel access mechanism, yield environments where even IEEE 802.11 devices must tolerate interference from one another.

A wireless communications device must have a sufficiently large signal to noise ratio to decode a received packet correctly. Noise from various sources affects the receiver. This noise can be thermal noise that is generated in the receiver itself or it can be noise external to the receiver. Noise external to the receiver may come from other devices in the area. The amount of noise received from such devices depends on the amount of power such a device transmits, the path loss to the receiver and the amount of power transmitted by the interfering device. The amount of interference is thus reduced if the interfering device transmits less power and transmits less frequently.

Any wireless communications device is a potential interferer to other devices. To reduce the interference generated, the wireless device can reduce its transmit power level. However, there is a level below which the transmit power cannot be reduced, because below this level the device that is being transmitted to will no longer be able to decode the transmission successfully. Thus it is desirable to transmit at or just above this threshold to minimize the amount of interference that other devices in the area experience as a result of the transmission.

In addition to power control, wireless devices may also control the rate at which they transmit. The rate of transmission controls the length of time that the wireless device must transmit. In packet-based systems such as wireless local area networks, transmission time includes of some fixed overhead typically including a preamble and header, and the payload. Thus the transmission time, $t_{TX}$, is equal to $$t_{TX} = t_0 + N_b/R$$

where $t_0$ is the overhead time, $N_b$ is the number of data bits in the packet and R is the transmission rate. Reduction of the amount of time, i.e. $t_{TX}$, that a wireless device transmits reduces the amount of interference to other devices. Increasing the transmission rate, R, reduces the transmission time. As the transmission rate, R, is increased, the received SNR threshold for the receiving device to properly decode the packet also increases. Depending on the transmit power and path loss, the transmitting device may or may not be able to transmit at its maximum rate, as the receiving device may not be able to decode at that rate. Wireless devices can control one or both of their transmission rate, R, and their transmit power level.

As illustrated by FIG. 1, in typical wireless communications devices, an adaptive method 110 controls the transmission rate (R) 120 based on inputs 130 such as the measured packet error rate (PER) 130c, signal to interference noise ratio (SINR) 130b and signal to noise ratio (SNR) 130a. In such wireless communication devices, e.g. 802.11 wireless LANs, the transmit power is fixed. At best, the transmit power may be changed via a user interface. It is not adaptively changed.

It is desirable in view of the foregoing to provide a solution that enables higher transmission rates at lower power levels and minimizes the level of interference generated. The present invention controls both the transmission rate and power level in a fashion that minimizes the level of interference generated by the act of transmission. The present invention enables enhanced coexistence of wireless devices via a joint transmit power and rate control scheme. By employing the present invention, wireless devices may reduce the level of mutual interference, thereby allowing improved performance.

BRIEF DESCRIPTION OF THE DRAWINGS

The above and further advantages of the invention may be better understood by referring to the following description in conjunction with the accompanying drawings in which corresponding numerals in the different figures refer to the corresponding parts, in which:

FIG. 1 diagrammatically illustrates controlling the transmission rate based on individual inputs in accordance with the prior art;

FIG. 2 diagrammatically illustrates a portion of an 802.11 based system in accordance with the known art;

FIG. 3 diagrammatically illustrates an adaptive joint transmission rate and power controller in accordance with an exemplary embodiment of the present invention;

FIG. 4 illustrates 802.11b compliant device rate and power pairs in accordance with an exemplary embodiment of the present invention;

FIG. 5A diagrammatically illustrates an adaptive joint transmission rate and power controller using PER as an input in accordance with an exemplary embodiment of the present invention;

FIG. 5B is an exemplary flow diagram for FIG. 5A;

DETAILED DESCRIPTION

Figure 5C:
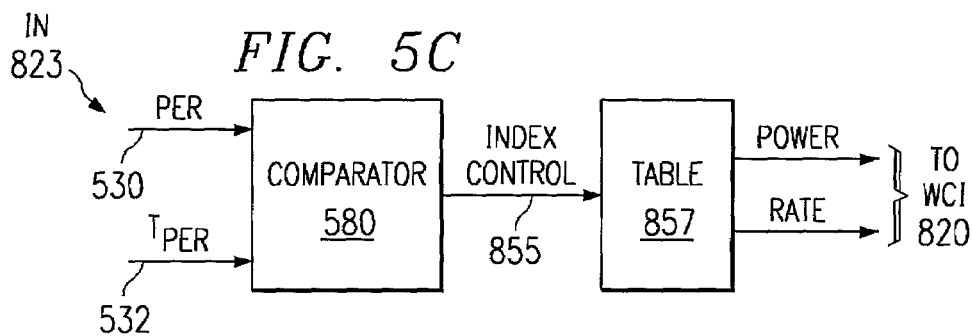
FIG. 5C diagrammatically illustrates part of FIG. 8 in greater detail.

While the making and using of various embodiments of the present invention are discussed herein in terms of Bluetooth and 802.11b compliant devices, it should be appreciated that the present invention provides many inventive concepts that can be embodied in a wide variety of contexts. The specific embodiments discussed herein are merely illustrative of specific ways to make and use the invention, and are not meant to limit the scope of the invention.

The present invention provides a solution that enables higher transmission rates at lower power levels and can minimize the level of interference generated. The present invention can optimally control both the transmission rate and the transmission power using one variable in a joint rate shift and power control function. Additionally, the present invention can maximize channel capacity by minimizing the transmission time.

The dominant source of power consumption is the amount of time spent transmitting; the power level is less important. It can be assumed that it is better to transmit at a higher rate, even if it is at a higher power, than to transmit at a lower rate in order to save power. Therefore, some embodiments of the present invention first maximize the transmission rate and then lower the transmission power level while maintaining the transmission rate.

The present invention jointly controls rate and power in a fashion that enables control of the two variables in one dimension. In some embodiments, this is done by ordering the possible transmit rate and transmit power combinations in a logical sequence that meets specific conditions. The present invention can first minimize the transmit time and then reduce the transmit power. The present invention can maintain the maximum rate possible that enables the receiving station to decode packets with an acceptable probability.

Secondarily, the transmit power is minimized. The transmit power is only reduced from its maximum level when the maximum transmit rate is achievable. By reducing the transmit power, the level of interference to other devices in the area is reduced. The transmit power will generally not be reduced below the point that yields the lowest acceptable probability of reception error. When the error rate at the receiver exceeds a selected level, the transmit power should be increased, if possible, otherwise the transmit data rate should be reduced. These actions will reduce the probability of error at the receiver.

In an exemplary implementation of the present invention, the joint power control and rate control method is used in a communication system that includes a transmitting apparatus 210 and a receiving apparatus 220. A portion of such a system is diagrammatically illustrated in FIG. 2. Examples of the communication system of FIG. 2 include Bluetooth and IEEE 80211.b systems. In an 802.11b system example, an Access Point (AP) 210 and station (STA) 220 communicate with one another. In this example, AP 210 transmits 215 to STA 220. The rate of transmit 320 and power level 340 (FIG. 3) are selected by AP 210. As many thousands of packets may be sent per second, AP 210 and/or STA 220 can obtain good estimates of inputs 330, such as SNR 330a, PER 330c and SINR 330b, as shown in FIG. 3. SNR 330a, PER 330c and SINR 330b are used as inputs 330 to joint adaptive transmission rate and power control method 310 that is implemented by AP 210. The method can be executed in a processor inside AP 210. It may also be directly implemented as hardcoded logic gates.

Upon transmit from AP 210 to STA 220, the SNR of the transmission is of interest. STA 220 has direct access to estimation of the SNR. AP 210 requires knowledge of the SNR as input 330a to joint rate and power control method 310. STA 220 may transmit this information to AP 210, or AP 210 may calculate an estimate of SNR 330a when STA 220 transmits to AP 210. The same is true for SINR 330b. PER 330c can be estimated using the acknowledgement 225 packets that are sent back from STA 220 to AP 210 after transmission from AP 210. This PER 330c estimate is also used as an input 330 to joint rate and power control method 310. Joint rate and power control method 310 selects a transmit power 340 and rate 320 pair from an ordered list. The ordered list is formed by listing all transmit rates from the least to the maximum along with the maximum transmit power, corresponding to indices 1-5 of FIG. 4 (discussed in more detail below). The list is then completed by listing the maximum transmit rate along with all transmit powers in decreasing order, corresponding to indices 6-9 in the example of FIG. 4.

As an example, the Texas Instruments ACX100, 802.11b compliant wireless local area network processor contains data rates of 1, 2, 5.5, 11 and 22 Mbps. A typical radio may allow transmit powers of 1, 5, 10, 30 and 100 mW. In accordance with some exemplary embodiments of the present invention, to minimize the amount of interference produced while still maximizing throughput, the rate and power pairs are ordered as shown in the table of FIG. 4. The index in FIG. 4 is mainly to assist in further reference to movement in the table. However, such an index could be used in an implementation and mapped to the appropriate rate and power pairs. Some embodiments initially enter the table at index 5 in an attempt to maximize the data rate.

The present invention also has the advantage that not all rate and power pairs are possible. This helps to avoid the possibility of operating at a rate and power pair that is suboptimal, as can occur when separate, non-joint rate and power control algorithms are used. Additionally, the adjustment of the transmit rate and power level affects the inputs to the joint rate control and transmit power method at 310 in FIG. 3. An increase in transmit power and/or decrease in rate tends to reduce the PER. Likewise a decrease in transmit power and/or increase in rate tends to increase the PER. An increase/decrease in transmit power tends to increase/decrease the SNR.

Alternatively, the present invention can be implemented as shown in FIG. 5A, with PER 530 as the only input. In this scenario, when PER 530 increases above a threshold, $T_{PER}$, adaptive rate and power control method 510 decreases the index of FIG. 4, which in turn has the affect of decreasing PER 530. Some embodiments increase the index into the table of FIG. 4 when PER 530 is very low (below a lower threshold).

FIG. 5B shows an exemplary flow diagram for the embodiment shown in FIG. 5A. A determination is made in block 515 as to whether or not the PER is above an upper, predetermined threshold. If the PER is above the upper, predetermined threshold at 515, then the present invention can decrease the index in block 520. The index from block 520 is then used in block 525 to obtain a rate and power pair from a rate and power table, such as that shown in FIG. 4. Alternatively, and/or in addition to the foregoing (as indicated by the dashed lines), the PER may also be compared to a lower threshold, as shown in block 540. If the PER is not below the lower, predetermined threshold, the present invention returns to 515. However, if the PER is below the lower, predetermined threshold at 540, then the present invention can increase the index in block 545.

Figure 6A:
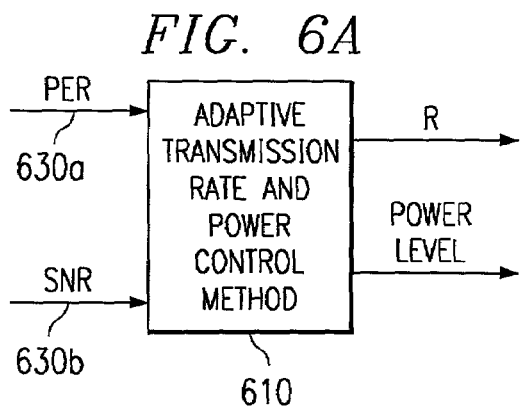
FIG. 6A diagrammatically illustrates an adaptive joint transmission rate and power controller using PER and SNR as inputs in accordance with an exemplary embodiment of the present invention.

In other embodiments of the invention, shown in FIG. 6A, SNR 630a and PER 630b are used as inputs 630. The index into the table of FIG. 4 is decreased when PER 630b is above $T_{PER}$ and/or when the SNR 630a falls below a lower threshold. Likewise, the index of FIG. 4 can be increased when SNR 630a moves above an upper threshold. In some embodiments, one or both of the upper and lower SNR thresholds are a function of the transmit data rate, so each individual data rate will have its own set of upper and lower thresholds. As the rate increases/decreases, the thresholds of SNR 630a will correspondingly increase/decrease.

Figure 6B:
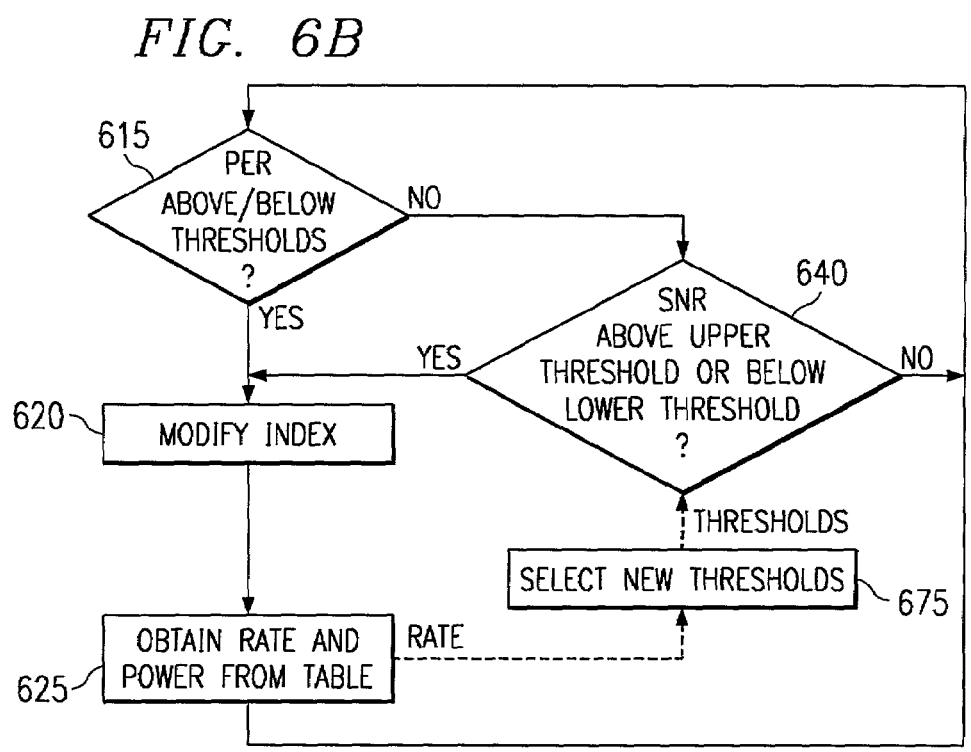
FIG. 6B is an exemplary flow diagram for FIG. 6A.

FIG. 6B shows an exemplary flow diagram for the embodiment shown in FIG. 6A. A determination is made in block 615 as to whether or not the PER is above an upper, predetermined threshold (as discussed above relative to FIG. 5B, PER may also be compared to a lower threshold). If the PER is not above/below the predetermined threshold, the present invention proceeds to 640. However, if the PER is above/below the predetermined threshold at 615, then the present invention can decrease/increase the index in block 620. Additionally, a determination is made in block 640 as to whether or not the SNR is either above an upper threshold or below a lower threshold. If the SNR is neither above the upper threshold nor below the lower threshold, the present invention returns to 615. However, if the SNR is above the upper threshold in block 640, then the present invention can increase the index in block 620. If the SNR is below the lower threshold in block 640, then the present invention can decrease the index in block 620. The index from block 620 is then used in block 625 to obtain a rate and power pair from a rate and power table, such as that shown in FIG. 4. In some embodiments, the rate selected in block 625 may be used in block 675 to select new thresholds for use in block 640.

Figure 6C:
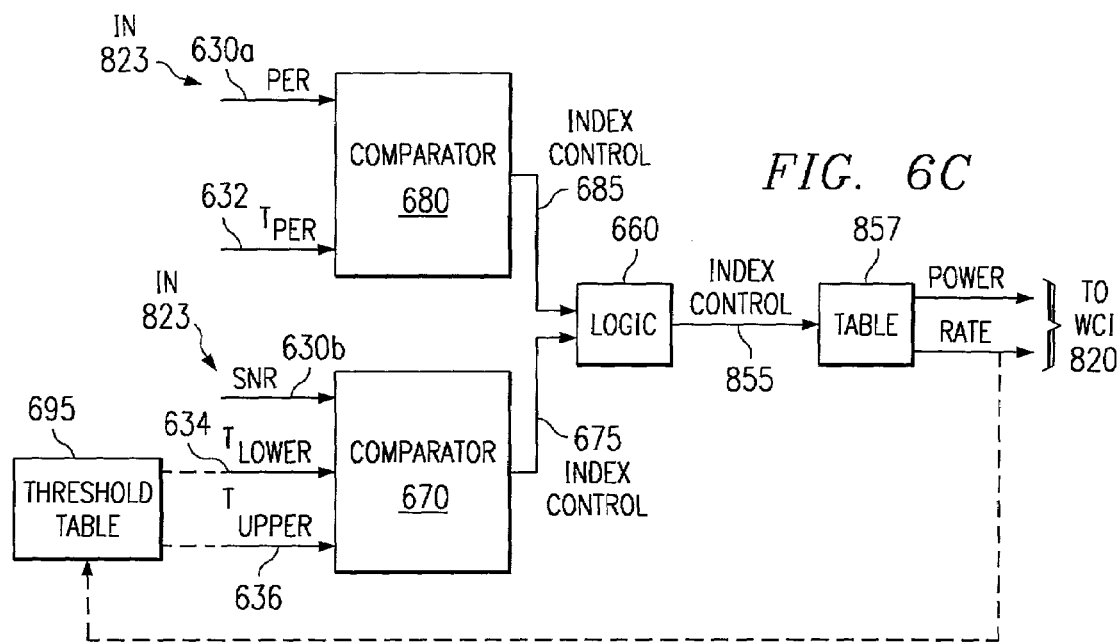
FIG. 6C diagrammatically illustrates part of FIG. 8 in greater detail.
Figure 7A:
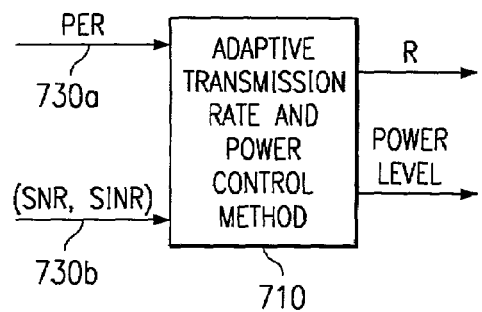
FIG. 7A diagrammatically illustrates an adaptive joint transmission rate and power controller using PER with a combination of SNR and SINR as inputs in accordance with an exemplary embodiment of the present invention.

FIG. 7A illustrates other embodiments of the invention, in which PER 730a is taken as an input 730 along with an (SNR, SINR) pair 730b as shown. The index into the table of FIG. 4 is decreased when PER 730a is above a threshold (e.g., $T_{PER}$ above) and/or when the (SNR, SINR) pair 730b indicates the current rate and power level setting can not be supported without an unacceptable level of packet errors (e.g., without exceeding the PER threshold). The lower and upper thresholds for use with the SNR/SINR pair 730b are analogous to the use of the upper and lower thresholds with SNR 630a in FIG. 6 embodiments. The thresholds for the (SNR, SINR) pair 730b can be precomputed for each possible rate. Likewise, the index of FIG. 4 is increased when the (SNR, SINR) pair 730b indicates that an increase in the index can be made without increasing PER 730a above the PER threshold. In some embodiments, one or both of the upper and lower (SNR, SINR) pair thresholds are a function of the transmit data rate, so each individual data rate will have its own set of upper and lower thresholds.

Figure 7B:
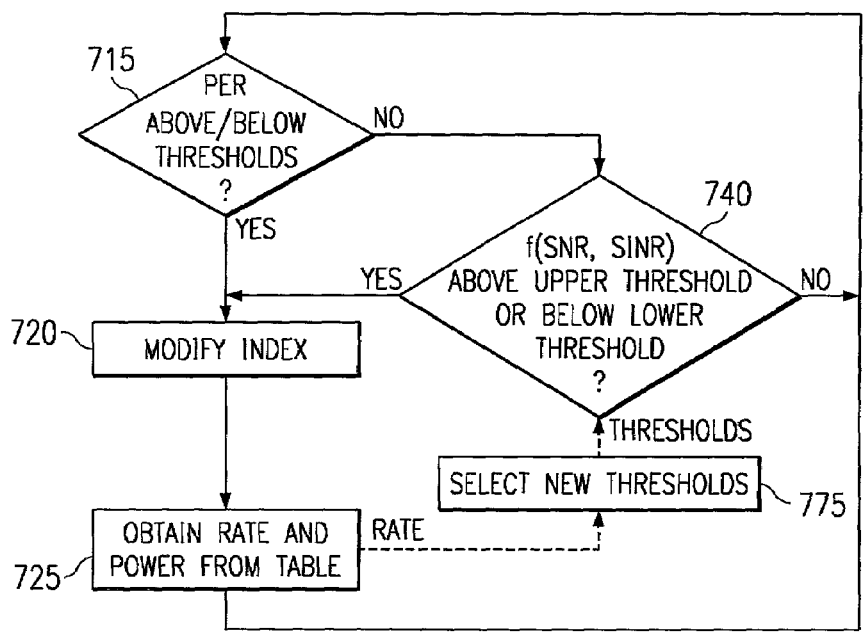
FIG. 7B is an exemplary flow diagram for FIG. 7A.

FIG. 7B shows an exemplary flow diagram for the embodiment shown in FIG. 7A. A determination is made in block 715 as to whether or not the PER is above an upper, predetermined threshold (as discussed above relative to FIG. 5B, PER may also be compared to a lower threshold). If the PER is not above/below the predetermined threshold at 715, the present invention proceeds to 740. However, if the PER is above/below the predetermined threshold, then the present invention can decrease/increase the index in block 720. A determination is made in block 740 as to whether or not f(SNR, SINR) (a predetermined function of the SNR, SINR pair) is either above an upper threshold or below a lower threshold. If f(SNR, SINR) is neither above the upper threshold nor below the lower threshold, the present invention returns to 715. However, if f(SNR, SINR) is above the upper threshold in block 740, then the present invention can increase the index in block 720. If f(SNR, SINR) is below the lower threshold in block 740, then the present invention can decrease the index in block 720. The index from block 720 is then used in block 725 to obtain a rate and power pair from a rate and power table, such as that shown in FIG. 4. In some embodiments (as indicated by the dashed lines), the rate selected in block 725 may be used in block 775 to select new thresholds for use in block 740.

Figure 8:
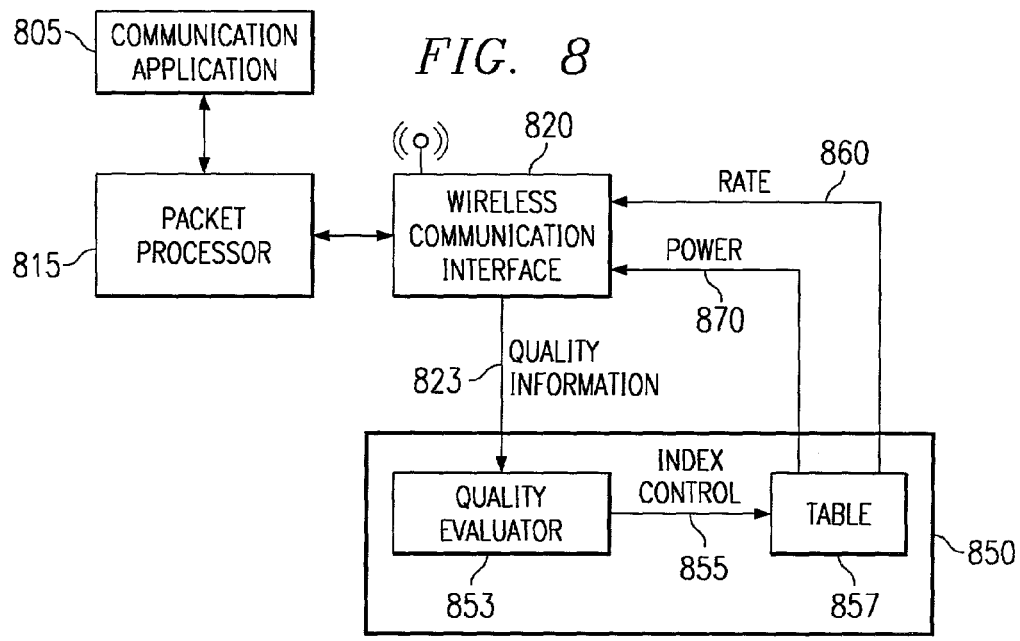
FIG. 8 diagrammatically illustrates a transmitting apparatus in accordance with exemplary embodiments of the present invention.

FIG. 8 diagrammatically illustrates exemplary embodiments of transmitting apparatus 210 of FIG. 2. In FIG. 8, communication application 805 sends and receives communication information to and from packet processor 815, which in turn exchanges packets with wireless communication interface (WCI) 820. Packet processor 815 can use conventional techniques to packetize information bound from communication application 805 to WCI 820, and to extract information from packets bound from WCI 820 to communication application 805. WCI 820 can interface packet processor 815 to a wireless communication channel in conventional fashion. WCI 820 sends quality information 823, such as conventionally available PER, SNR and SINR information, to joint rate and power controller 850. Joint rate and power controller 850 assesses quality information 823 in quality evaluator 853. The results from quality evaluator 853 are used to set index control 855. Index control 855 will determine which rate 860 and power 870 pairs of table 857 (e.g., the table of FIG. 4) are provided by joint rate and power controller 850 to control operation of WCI 820.

FIG. 5C illustrates exemplary embodiments of controller 850 of FIG. 8. The embodiments of FIG. 5C can perform the operations illustrated in FIG. 5B. PER 530 is obtained from WCI 820. PER 530 and a predetermined threshold (upper and/or lower as discussed above), $T_{PER}$ 532, are compared by comparator 580. The result of that comparison is used to set index control 855 into table 857.

FIG. 6C illustrates exemplary embodiments of controller 850 of FIG. 8. The embodiments of FIG. 6C can perform the operations illustrated in FIG. 6B. PER 630*a* and SNR 630*b* are obtained from WCI 820. PER 630*a* and a predetermined threshold (upper and/or lower as discussed above), $T_{PER}$ 632, are compared by comparator 680. The result of that comparison is used to set index control 685. In addition, SNR 630*b* and predetermined SNR thresholds, $T_{LOWER}$ 634 and $T_{UPPER}$ 636, are compared by comparator 670. The result of that comparison is used to set index control 675. Index controls 685 and 675 drive logic 660 to produce index control signal 855, to determine which of the rate and power pairs of table 857 are sent to WCI 820. In some embodiments (as indicated by the dashed lines), the rate selected from table 857 is used to select new thresholds from threshold table 695 for input to comparator 670.

Figure 7C:
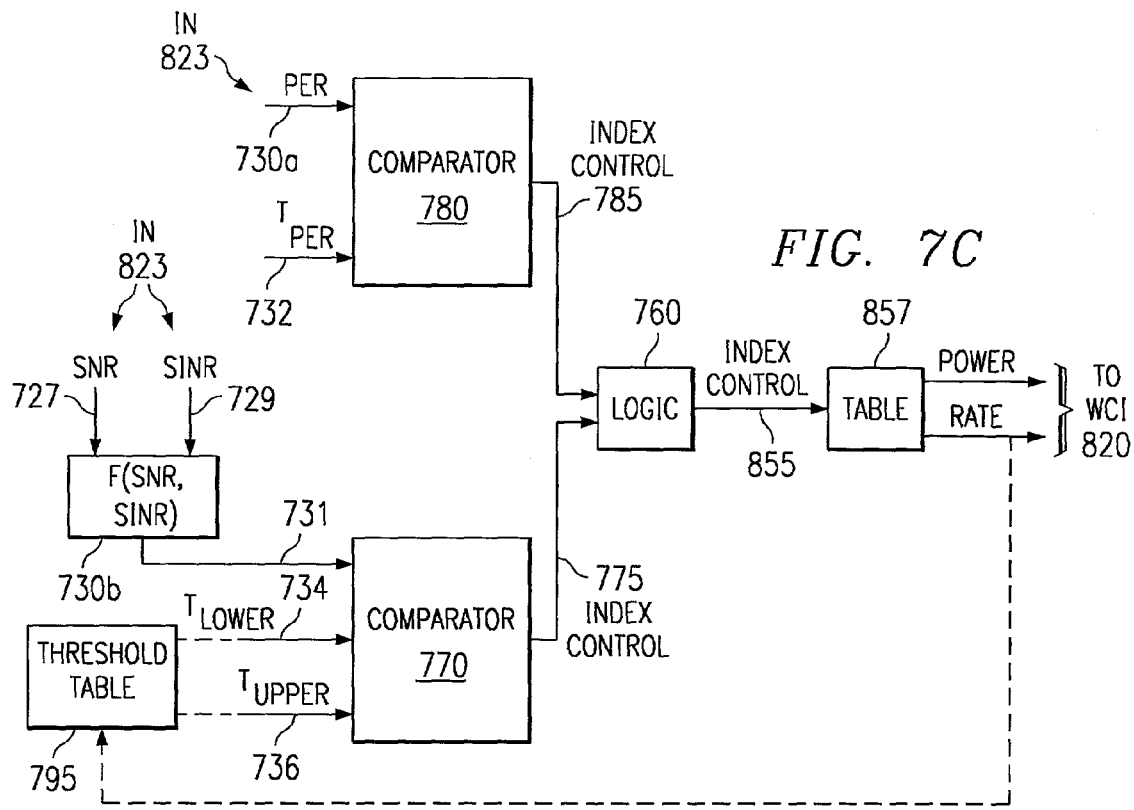
FIG. 7C diagrammatically illustrates part of FIG. 8 in greater detail.

FIG. 7C illustrates exemplary embodiments of controller 850 of FIG. 8. The embodiments of FIG. 7C can perform the operations illustrated in FIG. 7B. PER 730*a*, SNR 727, and SINR 729 are obtained from WCI 820. PER 730*a* and a predetermined threshold (upper and/or lower as discussed above), $T_{PER}$ 732, are compared by comparator 780. The result of that comparison is used to set index control 785. In addition, SNR 727 and SINR 729 are processed at 730*b* (e.g., used to access a look-up table) to form f(SNR, SINR). The f(SNR, SINR) 731 formed at 730*b* are compared by comparator 770 to thresholds, $T_{LOWER}$ 734 and $T_{UPPER}$ 736. The result of that comparison is used to set index control 775. Index controls 785 and 775 drive logic 760 to produce index control signal 855, to determine which of the rate and power pairs of table 857 are sent to WCI 820. In some embodiments (as indicated by the dashed lines), the rate selected from table 857 maybe used to select new thresholds from threshold table 795 for input to comparator 770.

The various threshold values described above, as well as the function, f(SNR, SINR), can be readily determined, for example, empirically through experimentation and/or simulations under expected operating conditions.

Although exemplary embodiments of the present invention have been described in detail, it will be understood by those skilled in the art that various modifications can be made therein without departing from the spirit and scope of the invention as set forth in the appended claims.

What is claimed is:

1. A method for jointly controlling the data rate and power level of data transmission across a communication channel, comprising:
   providing an ordered list of a plurality of transmit parameter pairs that each include information indicative of a data rate and information indicative of a power level, wherein ordering the list comprising:
      ordering the data rate for a first group of the transmit parameter pairs from lowest to highest, the data rate for each of the transmit parameter pairs of the first group paired with a common maximum power level:
      ordering the power level for a second group of the transmit parameter pairs from highest to lowest, the power level for each of the transmit parameter pairs of the second group paired with a common maximum data rate:
   transmitting at the data rate and power level indicated by a selected one of the transmit parameter pairs; and
   sequentially selecting different ones of the transmit parameter pairs to be the selected transmit parameter pair, including determining which of the transmit parameter pairs will be the next selected transmit parameter pair based on the currently selected transmit parameter pair and a communication quality condition associated with the communication channel.

2. The method of claim 1 wherein the communication quality condition includes a signal to noise ratio.

3. The method of claim 1 wherein the communication quality condition includes a signal to interference noise ratio.

4. The method of claim 1 wherein the communication quality condition includes a packet error rate.

5. The method of claim 1 wherein the communication quality condition includes a function of a signal to noise ratio and a signal to interference noise ratio.

6. The method of claim 1 wherein the communication channel is a wireless communication channel.

7. The method of claim 1 wherein the communication channel is a Bluetooth communication channel.

8. The method of claim 1 wherein the communication channel is an IEEE 802.11 b communication channel.

9. The method of claim 1 wherein the ordered list includes a plurality of adjacent integer indices respectively associated with the plurality of transmit parameter pairs.

10. The method of claim 9 wherein the sequentially selecting step includes stepping incrementally through the indices.

11. The method of claim 9 wherein the determining step includes evaluating the communication quality condition based on the currently selected transmit parameter pair.

12. An apparatus for jointly controlling the data rate and power level of data transmission across a communication channel, comprising:
   a storage portion for storing an ordered list of a plurality of transmit parameter pairs that each include information indicative of a data rate and information indicative of a power level, said storage portion having an output for outputting a selected one of the transmit parameter pairs, wherein the ordered list orders the data rate for a first group of the transmit parameter pairs from lowest to highest, the data rate for each of the transmit parameter pairs of the first group paired with a common maximum power level and wherein the ordered list further orders the power level for a second group of the transmit parameter pairs from highest to lowest, the power level for each of the transmit parameter pairs of the second group paired with a common maximum data rate;
   a communication interface coupled to said storage portion output for transmitting at the data rate and power level indicated by the selected transmit parameter pair; and
   a controller coupled to said storage portion for sequentially selecting different ones of the transmit parameter pairs to be the selected transmit parameter pair that is output from said storage portion, said controller including an input for receiving information indicative of a communication quality condition associated with the communication channel, and said controller operable for determining which of the transmit parameter pairs will be the next selected transmit parameter pair based on the communication quality condition and the currently selected transmit parameter pair.

13. The apparatus of claim 12 wherein the ordered list includes a plurality of adjacent integer indices respectively associated with the plurality of transmit parameter pairs.

14. The apparatus of claim 13 wherein the controller steps incrementally through the indices.

15. The apparatus of claim 12 wherein the controller evaluates the communication quality condition based on the currently selected transmit parameter pair.

16. The apparatus of claim 12 provided in one of a Bluetooth and an IEEE 802.11 b transmitter.

17. A communication system, comprising:
a transmitter for transmitting data on a communication channel;
a receiver for receiving via said communication channel the data transmitted by said transmitter; and
said transmitter including an apparatus for jointly controlling the data rate and power level at which the data is transmitted on the communication channel, including a storage portion for storing an ordered list of a plurality of transmit parameter pairs that each include information indicative of a data rate and information indicative of a power level, said storage portion having an output for outputting a selected one of the transmit parameter pairs, a communication interface coupled to said storage portion output for transmitting at the data rate and power level indicated by the selected transmit parameter pair, and a controller coupled to said storage portion for sequentially selecting different ones of the transmit parameter pairs to be the selected transmit parameter pair that is output from said storage portion, said controller including an input for receiving information indicative of a communication quality condition associated with the communication channel, and said controller operable for determining which of the transmit parameter pairs will be the next selected transmit parameter pair based on the communication quality condition and the currently selected transmit parameter pair, wherein the ordered list orders the data rate for a first group of the transmit parameter pairs from lowest to highest, the data rate for each of the transmit parameter pairs of the first group paired with a common maximum power level and wherein the ordered list further orders the power level for a second group of the transmit parameter pairs from highest to lowest, the power level for each of the transmit parameter pairs of the second group paired with a common maximum data rate.

* * * * *